United States Patent
Phipps

(10) Patent No.: US 11,161,053 B2
(45) Date of Patent: Nov. 2, 2021

(54) AUDIO PLAYING FRISBEE

(71) Applicant: Lucas Phipps, Brookston, IN (US)

(72) Inventor: Lucas Phipps, Brookston, IN (US)

( * ) Notice: Subject to any disclaimer, the term of this patent is extended or adjusted under 35 U.S.C. 154(b) by 18 days.

(21) Appl. No.: 16/813,236

(22) Filed: Mar. 9, 2020

(65) Prior Publication Data
US 2021/0275937 A1  Sep. 9, 2021

(51) Int. Cl.
| A63H 33/18 | (2006.01) |
| A63H 5/00 | (2006.01) |
| A63H 33/26 | (2006.01) |
| H04R 3/12 | (2006.01) |
| G06F 3/16 | (2006.01) |
| H04R 1/02 | (2006.01) |
| H04R 1/40 | (2006.01) |
| A63H 33/22 | (2006.01) |
| A63H 27/00 | (2006.01) |

(52) U.S. Cl.
CPC .............. *A63H 33/18* (2013.01); *A63H 5/00* (2013.01); *A63H 27/00* (2013.01); *A63H 33/22* (2013.01); *A63H 33/26* (2013.01); *G06F 3/165* (2013.01); *H04R 1/028* (2013.01); *H04R 1/403* (2013.01); *H04R 3/12* (2013.01)

(58) Field of Classification Search
CPC ............. A63H 1/28; A63H 5/00; A63H 33/18
See application file for complete search history.

(56) References Cited

U.S. PATENT DOCUMENTS

| 4,778,428 | A * | 10/1988 | Wield | A63H 33/18 446/47 |
| 4,869,699 | A | 9/1989 | Plambeck | |
| 5,319,531 | A * | 6/1994 | Kutnyak | A63H 33/18 362/184 |
| 5,611,083 | A | 3/1997 | Arnold | |
| 6,383,052 | B1 * | 5/2002 | McCarthy | A63H 33/18 446/153 |
| 6,604,742 | B2 | 8/2003 | Wl Sabbagh | |
| 6,764,371 | B2 | 7/2004 | Hartman | |
| 7,223,150 | B2 | 5/2007 | Chernick | |
| D572,315 | S | 7/2008 | Sowinski | |
| 8,952,629 | B2 * | 2/2015 | Griffiths | H05B 45/10 315/307 |
| 9,478,108 | B2 * | 10/2016 | Matte | H05B 45/10 |
| 9,873,064 | B1 * | 1/2018 | Adkins | H04R 1/028 |
| 10,296,050 | B2 * | 5/2019 | Shindo | H05K 5/03 |
| 2006/0183576 | A1 * | 8/2006 | Lindsey | A63H 33/26 473/570 |
| 2007/0007881 | A1 * | 1/2007 | Kim | B82Y 20/00 313/501 |

(Continued)

FOREIGN PATENT DOCUMENTS

WO   WO2012150982   11/2012

*Primary Examiner* — John A Ricci

(57) ABSTRACT

An audio playing frisbee for entertainment and recreation includes a disc and an audio player. The disc is resilient and configured to be grasped in a hand of a user, positioning the user to throw the disc. A void is centrally positioned in the disc. The void is circularly shaped and defines an inner perimeter of the disc. The audio player is shaped complementary to and is positioned in the void. The audio player is coupled to the disc. The audio player comprises a plurality of speakers so that the audio player is configured to broadcast an audio file.

16 Claims, 6 Drawing Sheets

(56) References Cited

U.S. PATENT DOCUMENTS

| | | | |
|---|---|---|---|
| 2011/0053716 A1* | 3/2011 | Lewis | A63H 33/18 473/570 |
| 2013/0303314 A1* | 11/2013 | Tackett | A63H 5/00 473/571 |
| 2015/0201262 A1* | 7/2015 | Balbach | H04R 1/028 381/334 |
| 2018/0021630 A1* | 1/2018 | Monnin | A63B 24/0062 473/570 |

* cited by examiner

AUDIO PLAYING FRISBEE

CROSS-REFERENCE TO RELATED APPLICATIONS

Not Applicable

STATEMENT REGARDING FEDERALLY SPONSORED RESEARCH OR DEVELOPMENT

Not Applicable THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to frisbees and more particularly pertains to a new frisbee for entertainment and recreation.

BRIEF SUMMARY OF THE INVENTION

An embodiment of the disclosure meets the needs presented above by generally comprising a disc and an audio player. The disc is resilient and configured to be grasped in a hand of a user, positioning the user to throw the disc. A void is centrally positioned in the disc. The void is circularly shaped and defines an inner perimeter of the disc. The audio player is shaped complementary to and is positioned in the void. The audio player is coupled to the disc. The audio player comprises a plurality of speakers so that the audio player is configured to broadcast an audio file.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
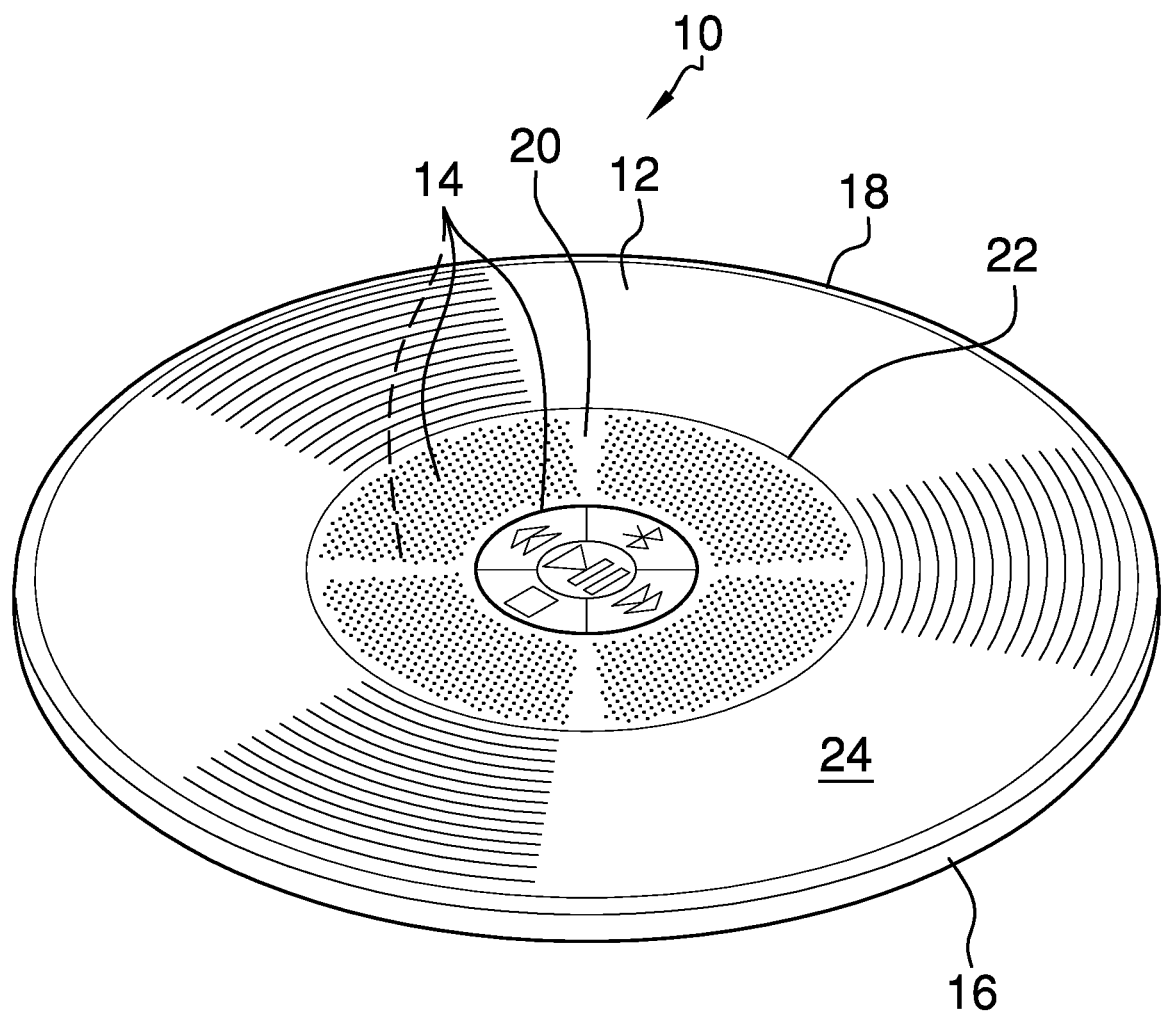
FIG. 1 is an isometric perspective view of an audio playing frisbee according to an embodiment of the disclosure.

With reference now to the drawings, and in particular to FIGS. 1 through 8 thereof, a new frisbee embodying the principles and concepts of an embodiment of the disclosure and generally designated by the reference numeral 10 will be described.

As best illustrated in FIGS. 1 through 8, the audio playing frisbee 10 generally comprises a disc 12 and an audio player 14. The disc 12 is resilient and is configured to be grasped in a hand of a user, positioning the user to throw the disc 12. The disc 12 comprises hardened rubber. A lip 16 is coupled to and extends substantially perpendicularly from an outer perimeter 18 of the disc 12, as shown in FIG. 1.

A void 20 is centrally positioned in the disc 12. The void 20 is circularly shaped and defines an inner perimeter 22 of the disc 12. The disc 12 tapers between the inner perimeter 22 and the outer perimeter 18 so that the disc 12 is dimensionally thinner proximate to the outer perimeter 18 relative to the inner perimeter 22.

The audio player 14 is shaped complementary to and is positioned in the void 20. The audio player 14 is coupled to the disc 12 so that the audio player 14 is flush with both an upper face 24 and a lower face 26 of the disc 12. The audio player 14 comprises a plurality of speakers 28 so that the audio player 14 is configured to broadcast an audio file. Broadcasting of the audio file serves to provide entertainment and facilitates locating of the disc 12 upon throwing of the disc 12, in particular for participants who are visually impaired.

The audio player 14 comprises a housing 30 that defines an interior space 32. The housing 30 is sealed so that the housing 30 is substantially watertight. A battery 34 is coupled to the housing 30 and positioned in the interior space 32. The battery 34 is rechargeable.

Figure 2:
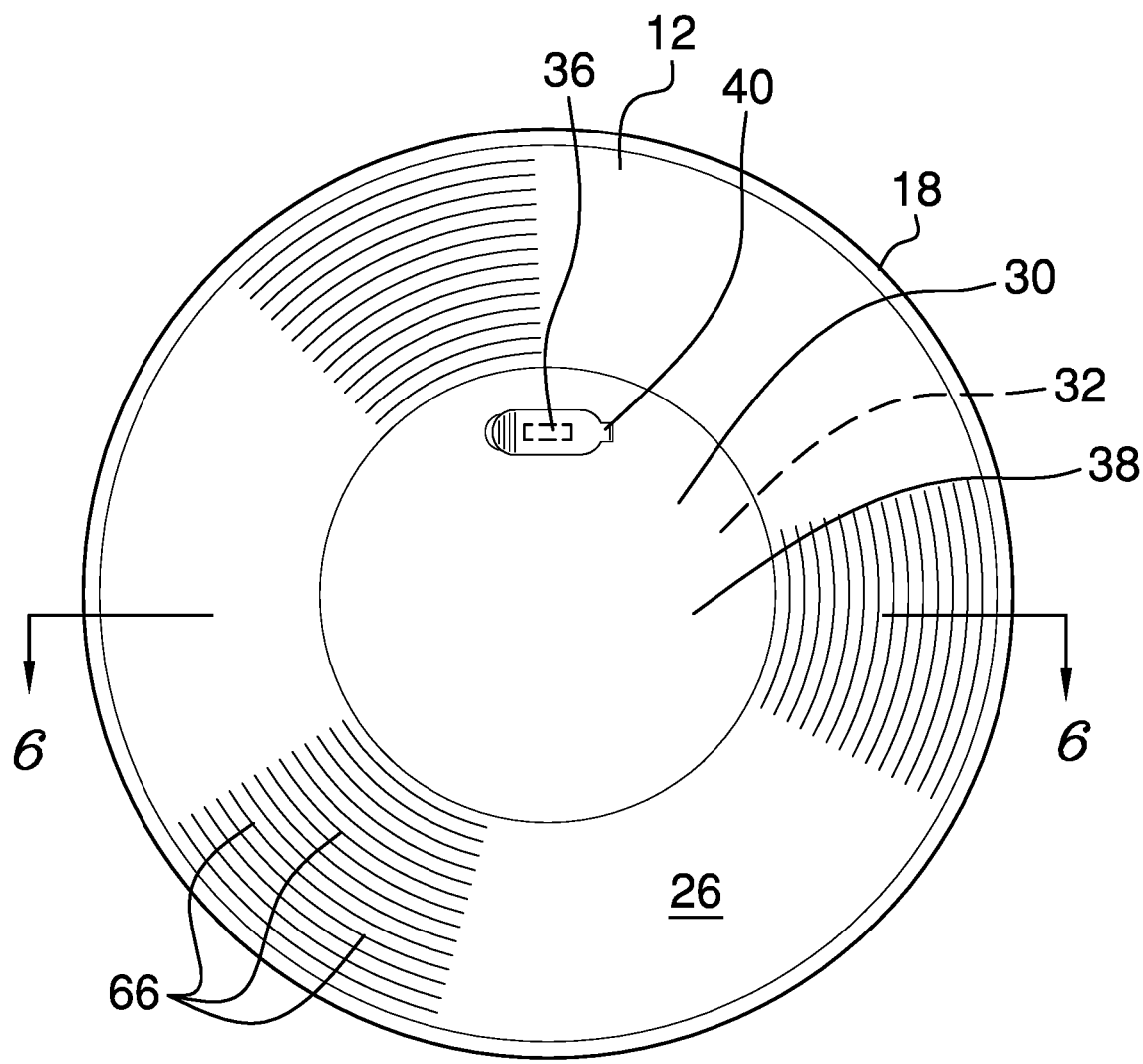
FIG. 2 is a bottom view of an embodiment of the disclosure.
Figure 3:
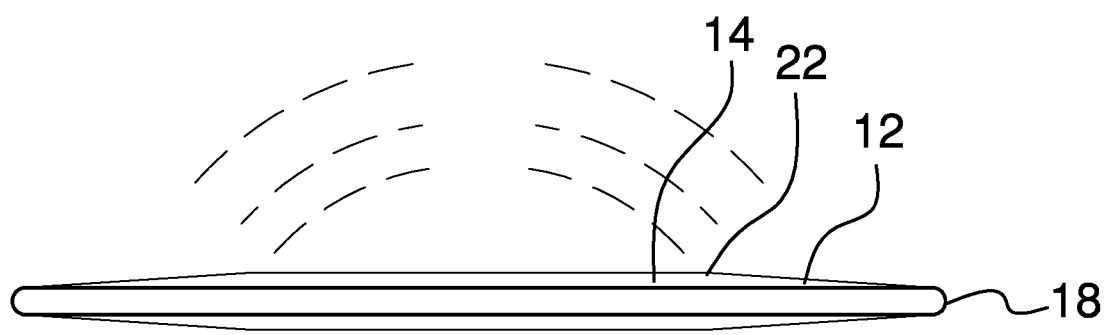
FIG. 3 is a side view of an embodiment of the disclosure.

A port 36 is coupled to the housing 30 and extends from a bottom 38 of the housing 30 into the interior space 32, as shown in FIG. 2. The port 36 is operationally coupled to the battery 34. The port 36 is configured to couple to a source of alternating current so that the port 36 is configured to charge the battery 34. A panel 40 is hingedly coupled to the housing 30 adjacent to the port 36. The panel 40 is configured to couple to the housing 30 to sealably cover the port 36.

Figure 6:
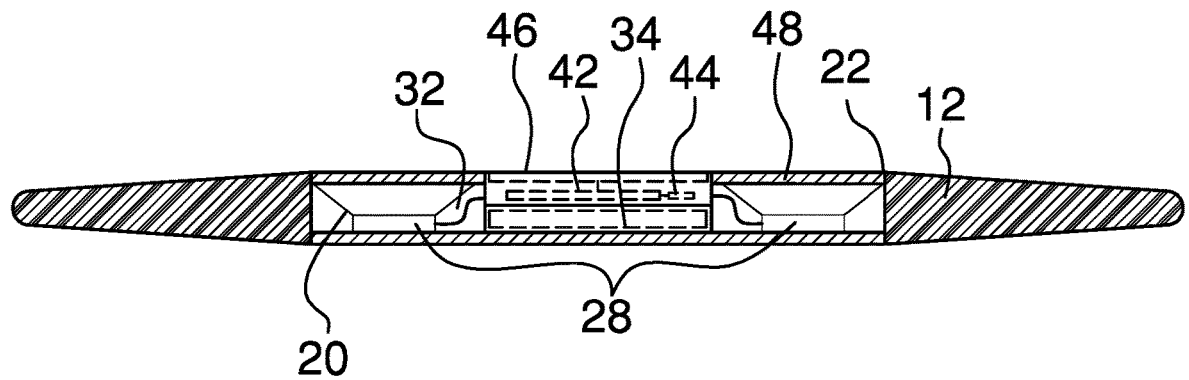
FIG. 6 is a cross-sectional view of an embodiment of the disclosure.

A microprocessor 42 and a receiver 44 are coupled to the housing 30 and are positioned in the interior space 32, as shown in FIG. 6. The microprocessor 42 is operationally coupled to the battery 34. The receiver 44 is operationally coupled to the microprocessor 42. The receiver 44 is configured to receive the audio file from an electronic device of the user.

A controller 46 is coupled to a top 48 of the housing 30. The controller 46 is operationally coupled to the microprocessor 42. The controller 46 is configured to selectively input commands into the microprocessor 42 to control the audio player 14. The controller 46 is disc shaped and extends from the top 48 of the housing 30 so that the controller 46 is flush with the upper face 24 of the disc 12.

Figure 4:
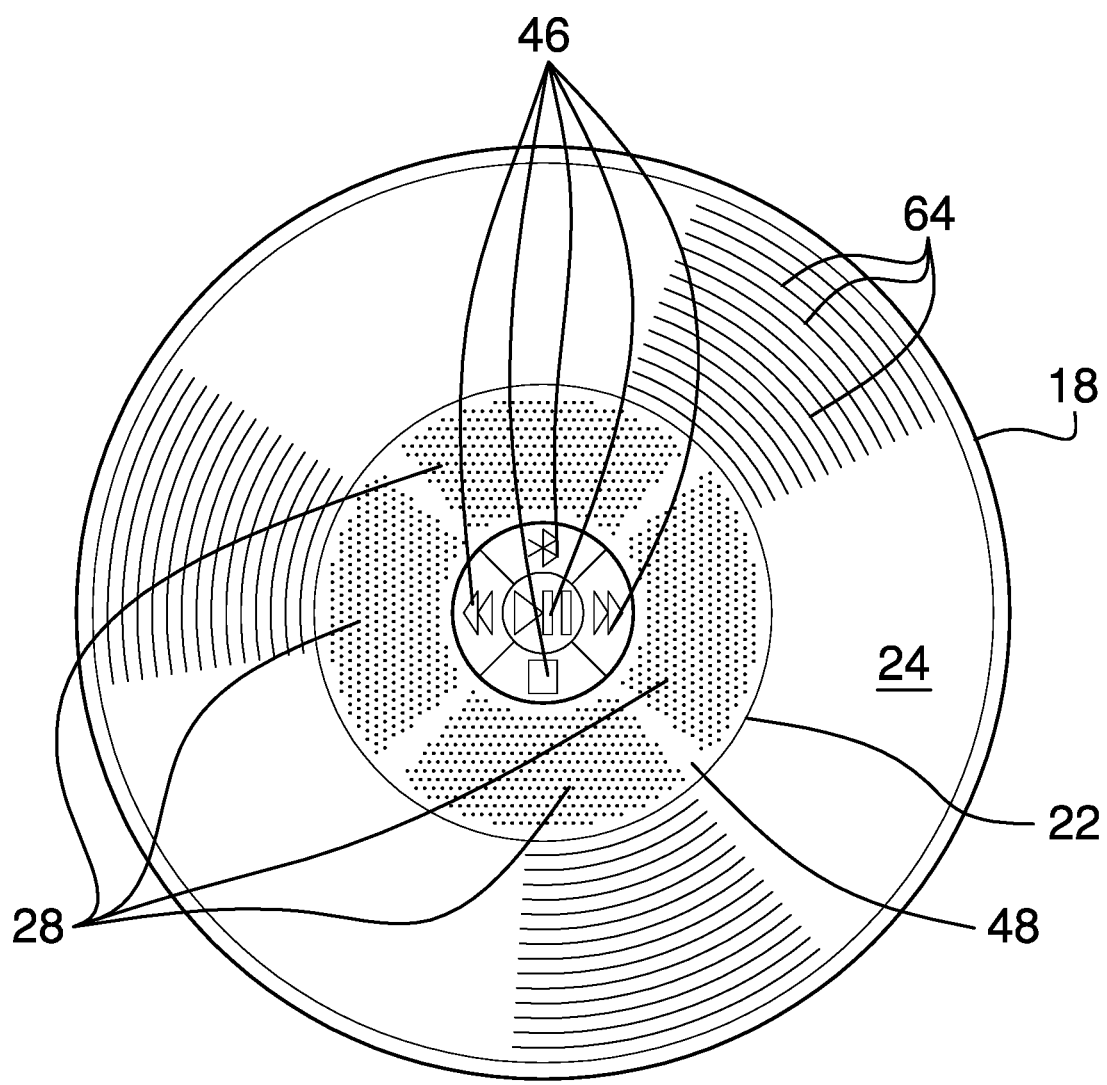
FIG. 4 is a top view of an embodiment of the disclosure.
Figure 5:
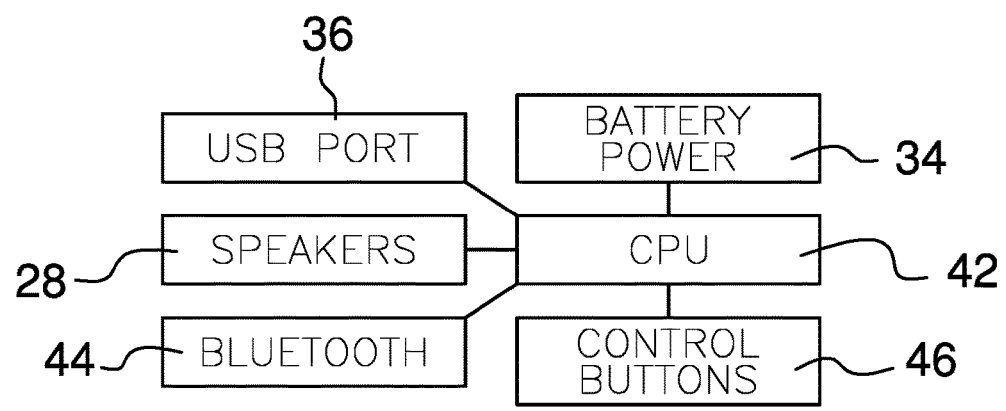
FIG. 5 is a block diagram of an embodiment of the disclosure.

The controller 46 comprises a first button 50, a second button 52, a third button 54, a fourth button 56, and a fifth button 58, as shown in FIG. 4. The first button 50, the second button 52, the third button 54, the fourth button 56, and the fifth button 58 are depressible. The first button 50 is configured to be depressed to signal the microprocessor 42 to command the receiver 44 to pair with the electronic device of the user. The second button 52 is configured to be depressed a first time to signal the microprocessor 42 to play the audio file. The second button 52 is configured to be depressed a second time to signal the microprocessor 42 to pause the playing of the audio file.

The third button 54 is configured to be depressed to signal the microprocessor 42 to stop the playing of the audio file. The fourth button 56 is configured to be depressed to signal the microprocessor 42 to skip to the next audio file. The fifth button 58 is configured to be depressed to signal the microprocessor 42 to return to the beginning of the audio file. The present invention also anticipates the controller 46 comprising a volume control to control a volume of the speakers 28.

The plurality of speakers 28 is operationally coupled to the microprocessor 42. The speakers 28 are positioned at the top 48 of the housing 30 so that the speakers 28 are flush with the upper face 24 of the disc 12. The plurality of speakers 28 comprises four speakers 28 that are positioned between the controller 46 and the inner perimeter 22 of the disc 12, as shown in FIG. 4.

Figure 7:
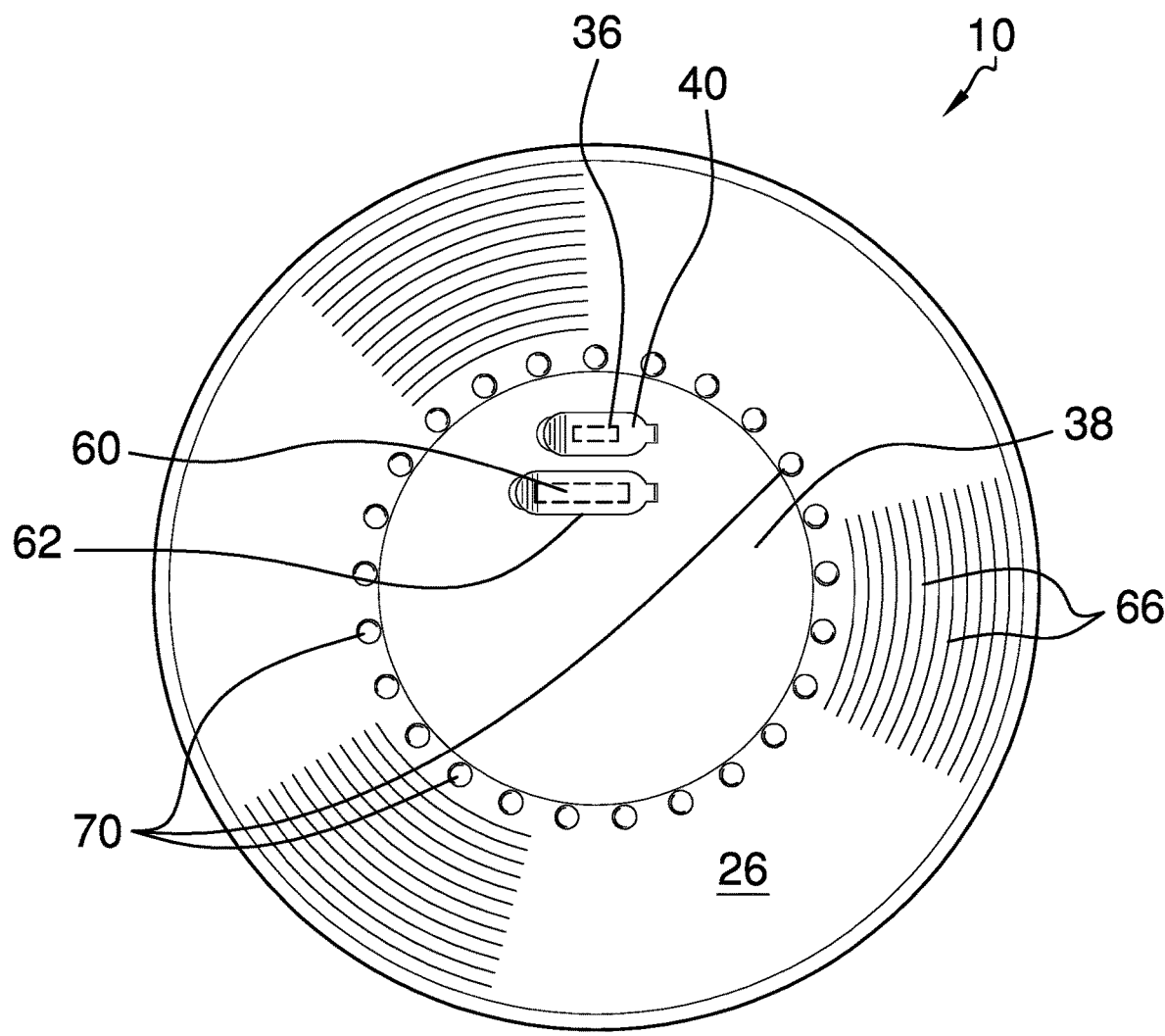
FIG. 7 is a bottom view of an embodiment of the disclosure.

In another embodiment of the invention, as shown in FIG. 7, a card slot 60 is coupled to the housing 30 and extends from the bottom 38 of the housing 30 into the interior space 32. The card slot 60 is operationally coupled to the microprocessor 42. The card slot 60 is configured to insert a memory card so that the audio player 14 is positioned to selectively play a respective audio file from a plurality of audio files that is positioned on the memory card. A slot panel 62 is hingedly coupled to the housing 30 adjacent to the card slot 60. The slot panel 62 is configured to couple to the housing 30 to sealably cover the card slot 60.

The disc 12 is black colored and is substantially circumferentially equivalent to a long-play album. A plurality of first circular groves 64 is positioned in the upper face 24 of the disc 12 and extends between the inner perimeter 22 and the outer perimeter 18 of the disc 12, as shown in FIG. 4. A plurality of second circular groves 66 is positioned in the lower face 26 of the disc 12 and extends between the inner perimeter 22 and the outer perimeter 18 of the disc 12, as shown in FIG. 2. The first circular grooves 64 and the second circular groove 66 are configured to mimic an appearance of the long-play album.

Figure 8:
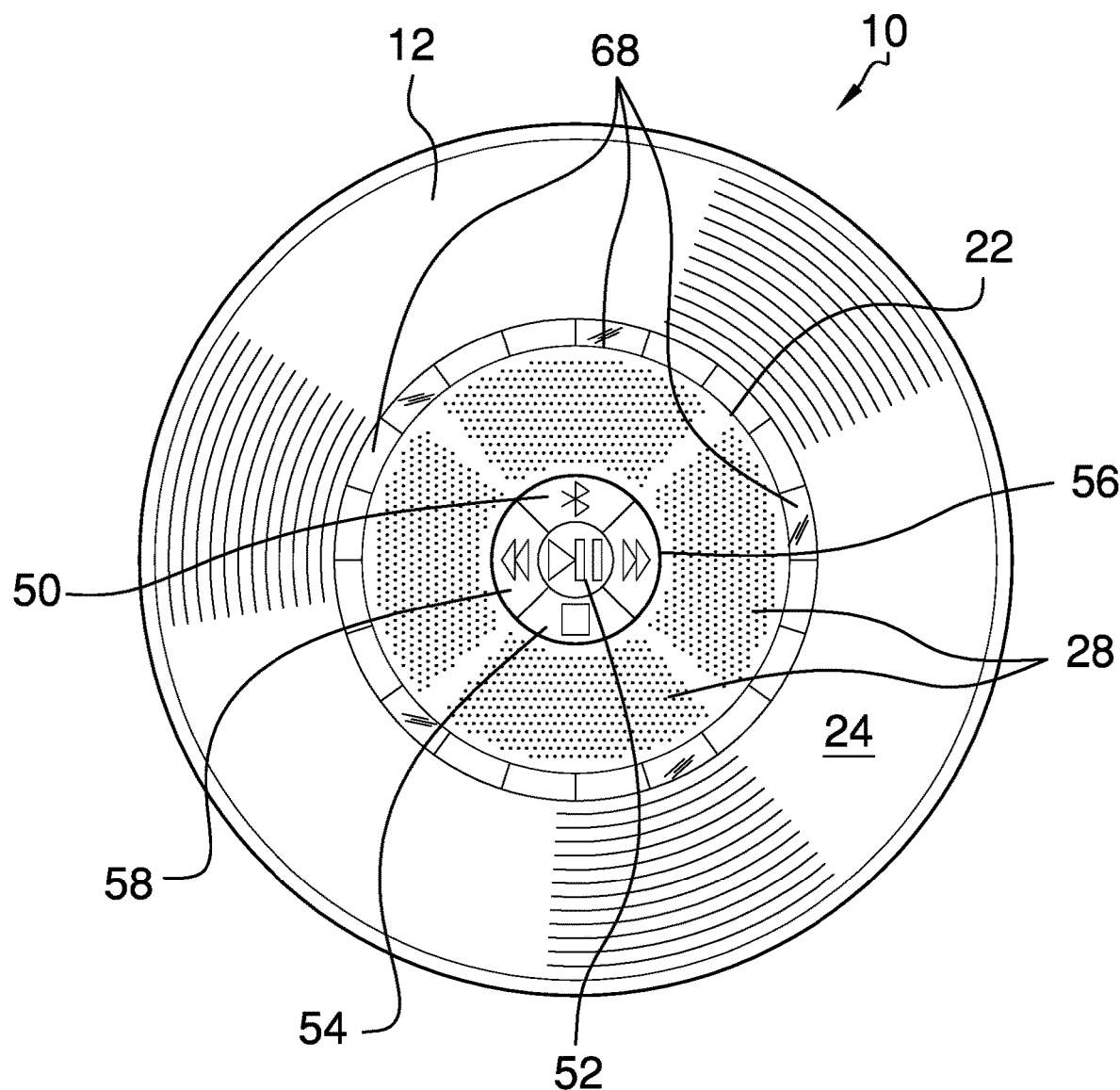
FIG. 8 is a top view of an embodiment of the disclosure.

In yet another embodiment of the invention, as shown in FIG. 8, a plurality of solar panels 68 is coupled to said disc 12 and is inset into the upper face 24 of the disc 12 so that said solar panels 68 are flush with the upper face 24. The solar panels 68 are circularly arrayed around the inner perimeter 22 of the disc 12. The solar panels 68 are operationally coupled to the battery 34 so that the solar panels 68 are configured to charge the battery 34.

In still yet another embodiment of the invention, as shown in FIG. 7, a plurality of bulbs 70 is coupled to the disc 12 and is inset into the lower face 26 of the disc 12 proximate to the inner perimeter 22 of the disc 12. The bulbs 70 are operationally coupled to the microprocessor 42. The microprocessor 42 is positioned to selectively operationally couple the bulbs 70 to the battery 34 to illuminate an area proximate to the lower face 26 of the disc 12. The illumination provided by the bulbs 70 enables the disc 12 to be used at night and to be more readily located after being thrown.

The bulbs 70 are light-emitting diode type. The microprocessor 42 is positioned to intermittently couple the bulbs 70 to the battery 34 so that the bulbs 70 flash to a beat of the audio file, providing additional entertainment value. Each bulb 70 emits a respective color so that the plurality of bulbs 70 comprises bulbs 70 that emit a variety of colors. The microprocessor 42 is positioned to selectively couple the bulbs 70 that emit a respective color to the battery 34 so that the color of light emitted by the plurality of bulbs 70 alternates to the beat of the audio file, providing additional entertainment value.

In use, the receiver 44 is paired with the electronic device of the user and receives the audio file. The audio file is broadcast by the speakers 28 to provide entertainment.

The disc 12 is thrown for recreation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An audio playing flying disc comprising:
    a disc, the disc being resilient wherein the disc is configured for grasping in a hand of a user, positioning the user to throw the disc;
    a void centrally positioned in the disc, the void being circularly shaped defining an inner perimeter of the disc; and
    an audio player shaped complementary to and positioned in the void, the audio player being coupled to the disc, the audio player comprising a plurality of speakers wherein the audio player is configured to broadcast an audio file, the audio player being flush with both an upper face and a lower face of the disc, the audio player comprising
        a housing defining an interior space, the housing being sealed such that the housing is substantially watertight, a battery coupled to the housing and positioned in the interior space, a microprocessor coupled to the housing and positioned in the interior space, the microprocessor being operationally coupled to the battery, a receiver coupled to the housing and positioned in the interior space, the receiver being operationally coupled to the microprocessor wherein the receiver is configured for receiving the audio file from an electronic device of the user, a controller coupled to a top of the housing, the controller being operationally coupled to the microprocessor wherein the controller is configured for selectively inputting commands into the microprocessor for controlling the audio player, the controller being disc shaped, the controller extending from the top of the housing such that the controller is flush with the upper face of the disc, the plurality of speakers being operationally coupled to the microprocessor, a card slot coupled to the housing and extending from the bottom of the housing into the interior space, the card slot being operationally coupled to the microprocessor wherein the card slot is configured for inserting a memory card such that the audio player is positioned for selectively playing a respective audio file from a plurality of audio files positioned on the memory card, and a slot panel hingedly coupled to the housing adjacent to the card slot, the slot panel being configured for coupling to the housing for sealably covering the card slot.

2. The flying disc of claim 1, further including the disc comprising hardened rubber.

3. The flying disc of claim 1, further including a lip coupled to and extending substantially perpendicularly from an outer perimeter of the disc.

4. The flying disc of claim 1, further including the controller comprising:

a first button, the first button being depressible wherein the first button is configured for depressing for signaling the microprocessor for commanding the receiver for pairing with the electronic device of the user;

a second button, the second button being depressible wherein the second button is configured for depressing a first time for signaling the microprocessor for playing the audio file and for depressing a second time for signaling the microprocessor for pausing the playing of the audio file;

a third button, the third button being depressible wherein the third button is configured for depressing for signaling the microprocessor for stopping the playing of the audio file;

a fourth button, the fourth button being depressible wherein the fourth button is configured for depressing for signaling the microprocessor for skipping to the next audio file; and a fifth button, the fifth button being depressible wherein the fifth button is configured for depressing for signaling the microprocessor for returning to the beginning of the audio file.

5. The flying disc of claim 1, further including the speakers being positioned at the top of the housing such that the speakers are flush with the upper face of the disc.

6. The flying disc of claim 1, further including the plurality of speakers comprising four speakers positioned between the controller and the inner perimeter of the disc.

7. The flying disc of claim 1, further including comprising:

the battery being rechargeable;

a port coupled to the housing and extending from a bottom of the housing into the interior space, the port being operationally coupled to the battery, the port being configured for coupling to a source of alternating current wherein the port is configured for charging the battery; and a panel hingedly coupled to the housing adjacent to the port, the panel being configured for coupling to the housing for sealably covering the port.

8. The flying disc of claim 7, further including a plurality of solar panels coupled to said disc and inset into the upper face of the disc such that said solar panels are flush with the upper face, the solar panels being operationally coupled to the battery wherein the solar panels are configured for charging the battery.

9. The flying disc of claim 8, further including the solar panels being circularly arrayed around the inner perimeter of the disc.

10. The flying disc of claim 1, further including comprising:

the disc being black colored, the disc being substantially circumferentially equivalent to a long-play album;

a plurality of first circular groves positioned in the upper face of the disc and extending between the inner perimeter and an outer perimeter of the disc; and a plurality of second circular groves positioned in the lower face of the disc and extending between the inner perimeter and an outer perimeter of the disc wherein the first circular grooves and the second circular groove are configured tor mimicking an appearance of the long-play album.

11. The flying disc of claim 1, further including a plurality of bulbs coupled to the disc and inset into the lower face of the disc proximate to the inner perimeter of the disc, the bulbs being operationally coupled to the microprocessor wherein the microprocessor is positioned for selectively operationally coupling the bulbs to the battery for illuminating an area proximate to the lower face of the disc.

12. The flying disc of claim 11, further including the bulbs being light-emitting diode type.

13. The flying disc of claim 11, further including the microprocessor being positioned for intermittently coupling the bulbs to the battery such that the bulbs flash to a beat of the audio file.

14. The flying disc of claim 11, further including each bulb emitting a respective color such that the plurality of bulbs comprises bulbs emitting a variety of colors, the microprocessor being positioned for selectively coupling the bulbs emitting a respective color to the battery such that the color of light emitted by the plurality of bulbs alternates to the beat of the audio file.

15. The flying disc of claim 1, further including the disc tapering between the inner perimeter and an outer perimeter such that the disc is dimensionally thinner proximate to the outer perimeter relative to the inner perimeter.

16. An audio playing flying disc comprising:

a disc, the disc being resilient wherein the disc is configured for grasping in a hand of a user, positioning the user to throw the disc, the disc comprising hardened rubber, the disc being black colored, the disc being substantially circumferentially equivalent to a tong-play album;

a lip coupled to and extending substantially perpendicularly from an outer perimeter of the disc;

a void centrally positioned in the disc, the void being circularly shaped defining an inner perimeter of the disc, the disc tapering between the inner perimeter and the outer perimeter such that the disc is dimensionally thinner proximate to the outer perimeter relative to the inner perimeter;

an audio player shaped complementary to and positioned in the void, the audio player being coupled to the disc, the audio player comprising a plurality of speakers Wherein the audio player is configured to broadcast an audio file, the audio player being flush with both an upper face and a lower face of the disc, the audio player comprising:

a housing defining an interior space, the housing being sealed such that the housing is substantially watertight, a battery coupled to the housing and positioned in the interior space, the battery being rechargeable, a microprocessor coupled to the housing and positioned in the interior space, the microprocessor being operationally coupled to the battery, a receiver coupled to the housing and positioned in the interior space, the receiver being operationally coupled to the microprocessor wherein the receiver is configured for receiving the audio file from an electronic device of the user, a controller coupled to a top of the housing, the controller being operationally coupled to the microprocessor wherein the controller is configured for selectively inputting commands into the microprocessor for controlling the audio player, the controller being disc shaped, the controller extending from the top of the housing such that the controller is flush with the upper face of the disc, the controller comprising:

a first button, the first button being depressible wherein the first button is configured for depressing for signaling the microprocessor for commanding the receiver for pairing with the electronic device of the user, a second button, the second button being depressible wherein the second button is configured for depressing a first time for signaling the microprocessor for playing the audio file and for depressing a second time for signaling the microprocessor for pausing the playing of the audio file, a third button, the third button being depressible wherein the third button is configured for depressing for signaling the microprocessor for stopping the playing of the audio file, a fourth button, the fourth button being depressible wherein the fourth button is configured for depressing for signaling the microprocessor for skipping to the next audio file, and a fifth button, the fifth button being depressible wherein the fifth button is configured for depressing for signaling the microprocessor for returning to the beginning of the audio file, the plurality of speakers being operationally coupled to the microprocessor, the speakers being positioned at the top of the housing such that the speakers are flush with the upper face of the disc, the plurality of speakers comprising four speakers positioned between the controller and the inner perimeter of the disc, a port coupled to the housing and extending from a bottom of the housing into the interior space, the port being operationally coupled to the battery, the port being configured for coupling to a source of alternating current wherein the port is configured for charging the battery, a panel hingedly coupled to the housing adjacent to the port, the panel being configured for coupling to the housing for sealably covering the port, a card slot coupled to the housing and extending from the bottom of the housing into the interior space, the card slot being operationally coupled to the microprocessor wherein the card slot is configured for inserting a memory card such that the audio player is positioned for selectively playing a respective audio file from a plurality of audio files positioned on the memory card, and a slot panel hingedly coupled to the housing adjacent to the card slot, the slot panel being configured for coupling to the housing for sealably covering the card slot;

a plurality of first circular groves positioned in the upper face of the disc and extending between the inner perimeter and the outer perimeter of the disc;

a plurality of second circular groves positioned in the lower face of the disc and extending between the inner perimeter and the outer perimeter of the disc wherein the first circular grooves and the second circular groove are configured for mimicking an appearance of the long-play album;

a plurality of solar panels coupled to said disc and inset into the upper face of the disc such that said solar panels are flush with the upper face, the solar panels being operationally coupled to the battery wherein the solar panels are configured for charging the battery, the solar panels being circularly arrayed around the inner perimeter of the disc; and a plurality of bulbs coupled to the disc and inset into the lower face of the disc proximate to the inner perimeter of the disc, the bulbs being operationally coupled to the microprocessor wherein the microprocessor is positioned for selectively operationally coupling the bulbs to the battery for illuminating an area proximate to the lower face of the disc, the bulbs being light-emitting diode type, the microprocessor being positioned for intermittently coupling the bulbs to the battery such that the bulbs flash to a beat of the audio file, each bulb emitting a respective color such that the plurality of bulbs comprises bulbs emitting a variety of colors, the microprocessor being positioned for selectively coupling the bulbs emitting a respective color to the battery such that the color of light emitted by the plurality of bulbs alternates to the beat of the audio file.

* * * * *